(12) United States Patent
McCoy (10) Patent No.: US 7,671,634 B2
(45) Date of Patent: Mar. 2, 2010

(54) REDUNDANT CLOCK SWITCH CIRCUIT

(75) Inventor: Scott McCoy, Halfway, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/830,126

(22) Filed: Jul. 30, 2007

(65) Prior Publication Data

US 2009/0033380 A1    Feb. 5, 2009

(51) Int. Cl.
*H03K 17/00* (2006.01)
*G06F 1/08* (2006.01)

(52) U.S. Cl. .......................... 327/99; 327/407; 327/408

(58) Field of Classification Search .................. 327/99, 327/298, 407, 408
See application file for complete search history.

(56) References Cited

U.S. PATENT DOCUMENTS

| | | | | |
|---|---|---|---|---|
| 5,355,090 | A | | 10/1994 | Pajowski et al. |
| 5,515,403 | A | * | 5/1996 | Sloan et al. ................. 375/371 |
| 5,748,569 | A | * | 5/1998 | Teodorescu et al. ......... 368/118 |
| 6,104,228 | A | * | 8/2000 | Lakshmikumar ............ 327/407 |
| 6,204,732 | B1 | | 3/2001 | Rapoport et al. |
| 6,937,682 | B2 | | 8/2005 | Hofs et al. |
| 2002/0054656 | A1 | | 5/2002 | Hofs et al. |
| 2003/0184355 | A1 | * | 10/2003 | Lee ............................ 327/158 |

OTHER PUBLICATIONS

Integrated Device Technology, Inc., "Differential-to-3.3V LVPECL Zero/Delay/Multiplier/Divider" (Data Sheet), ICS873996AY, Rev. A, Jan. 18, 2007, 20 pages.

* cited by examiner

*Primary Examiner*—Lincoln Donovan
*Assistant Examiner*—Adam D Houston (57) ABSTRACT

A redundant clock switch circuit that includes two delay circuits and control logic is presented. The first delay circuit is configured to delay a first clock signal to produce a first delayed clock signal, while the second delay circuit is configured to delay a second clock signal to produce a second delayed clock signal. The control logic is configured to control the delay circuits to maintain phase alignment between the first and second delayed clock signals. The control logic is also configured to select one of the first and second delayed clock signals as an output clock signal.

20 Claims, 4 Drawing Sheets

REDUNDANT CLOCK SWITCH CIRCUIT

BACKGROUND

A common characteristic of computers and other digital electronic systems is the use of synchronous logic driven by at least one digital clock signal. Generally, a clock signal alternates between a logic "high" level and a logic "low" level at a selected frequency compatible with the logic circuit being driven. Typically, the clock signal is generated by an oscillator circuit driven by a crystal excited into oscillation by a direct-current (DC) power supply voltage. The use of the crystal often results in a highly stable frequency source that is accurate within a few parts per million.

However, despite the accuracy and stability most clock signals exhibit, hardware problems periodically arise which cause the clock signal to temporarily or permanently fail. Such failures may include significant changes in the voltage levels of the clock signal, unacceptable variations in frequency or phase of the clock signal (often termed "jitter"), or even complete loss of the clock signal. Any of these faults are likely to result in improper operation of the associated digital circuitry. While most low-end computing systems and other electronic equipment, such as home computers, personal digital assistants (PDAs), and the like, are affected by clock problems, loss of data resulting from such failures is rarely catastrophic. However, with mid-range and high-end computing systems, such as commercial database and communication servers, any data integrity problems or downtime associated with clock signal faults may result in significant loss of revenue and decreased customer satisfaction.

To protect against clock signal errors, some computer systems employ two independent clock signal sources in conjunction with a switch circuit to forward one of the clock signals to drive the system logic. Thus, if problems are detected with one clock signal, the other may be selected quickly as the system clock signal by way of the switch.

However, two independent clock signal sources with ostensibly the same frequency are likely to be out of phase with each other, and may also exhibit slightly different frequencies. As a result, merely switching from one clock signal to another may introduce signal glitches, runt pulses, and the like into the clock signal being output from the switch, again causing problems to the system logic. Thus, the output of the switch is often configured to drive a phase-locked loop (PLL) circuit designed to ignore such temporary problems in the selected clock signal while generating an output clock signal with the same frequency as the clock signal leaving the switch. Also, the PLL circuit is capable of introducing a small phase error into the selected clock signal to address a phase difference between the input clock signals.

Unfortunately, use of the PLL circuit often introduces additional jitter into the output clock signal beyond that of the original input clock signal. The PLL circuit may also interact with one or more other PLL circuits coupled with the output clock signal, potentially introducing cascaded PLL stability problems into each of the other PLL circuits involved.

DETAILED DESCRIPTION

Figure 1:
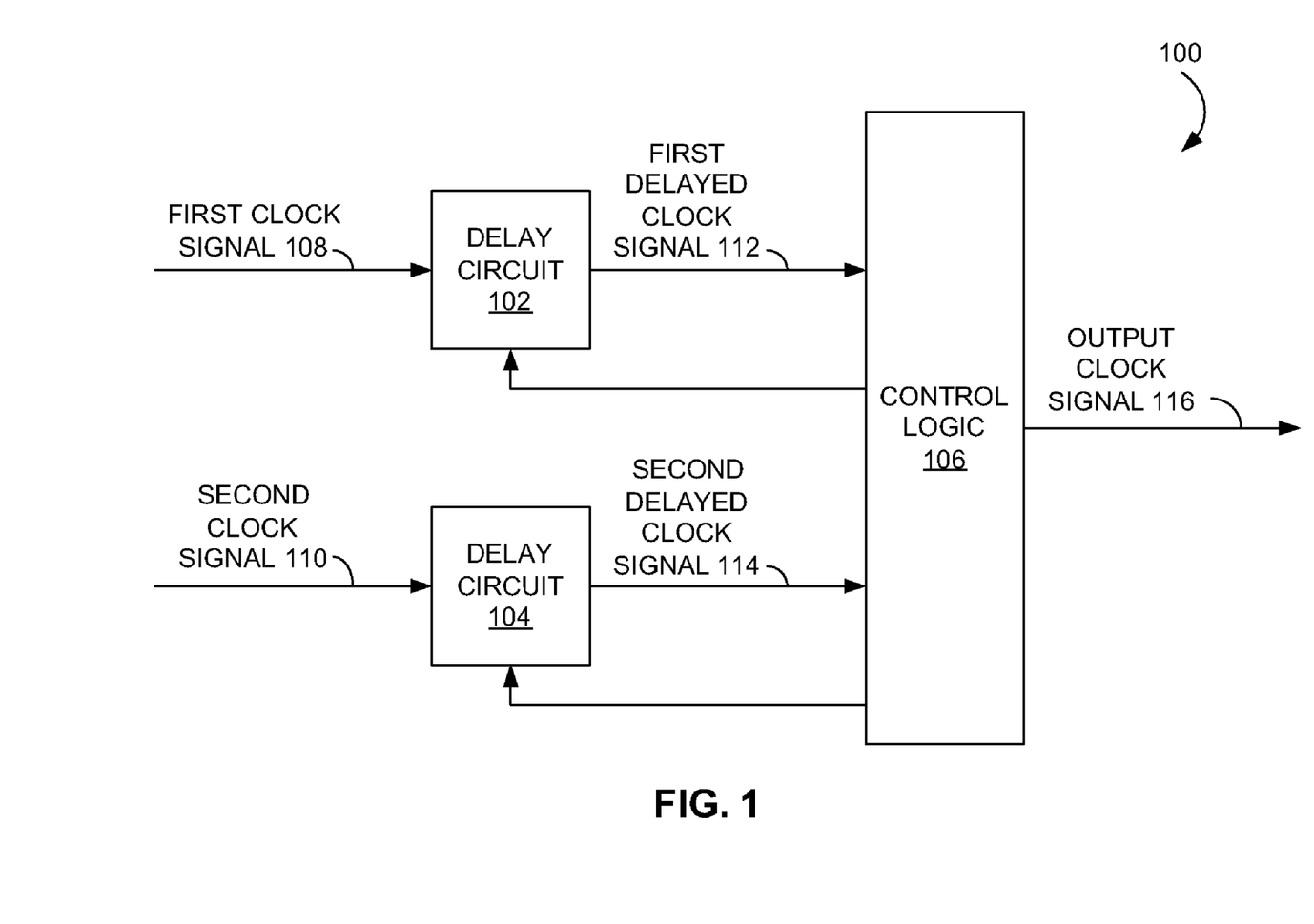
FIG. 1 is a block diagram of a redundant clock switch circuit according to an embodiment of the invention.

FIG. 1 provides a block diagram of one embodiment of the invention: a redundant clock switch circuit 100 that includes a first delay circuit 102, a second delay circuit 104 and control logic 106. The first delay circuit 102 is configured to delay a first clock signal 108 to produce a first delayed clock signal 112. Similarly, the second delay circuit 104 is configured to delay a second clock signal 110 to produce a second delayed clock signal 114. The control logic 106 is configured to control both the first delay circuit 102 and the second delay circuit 104 to maintain phase alignment between the first delayed clock signal 112 and the second delayed clock signal 114. The control logic 106 is also configured to select one of the delayed clock signals 112, 114 as an output clock signal 116.

Figure 2:
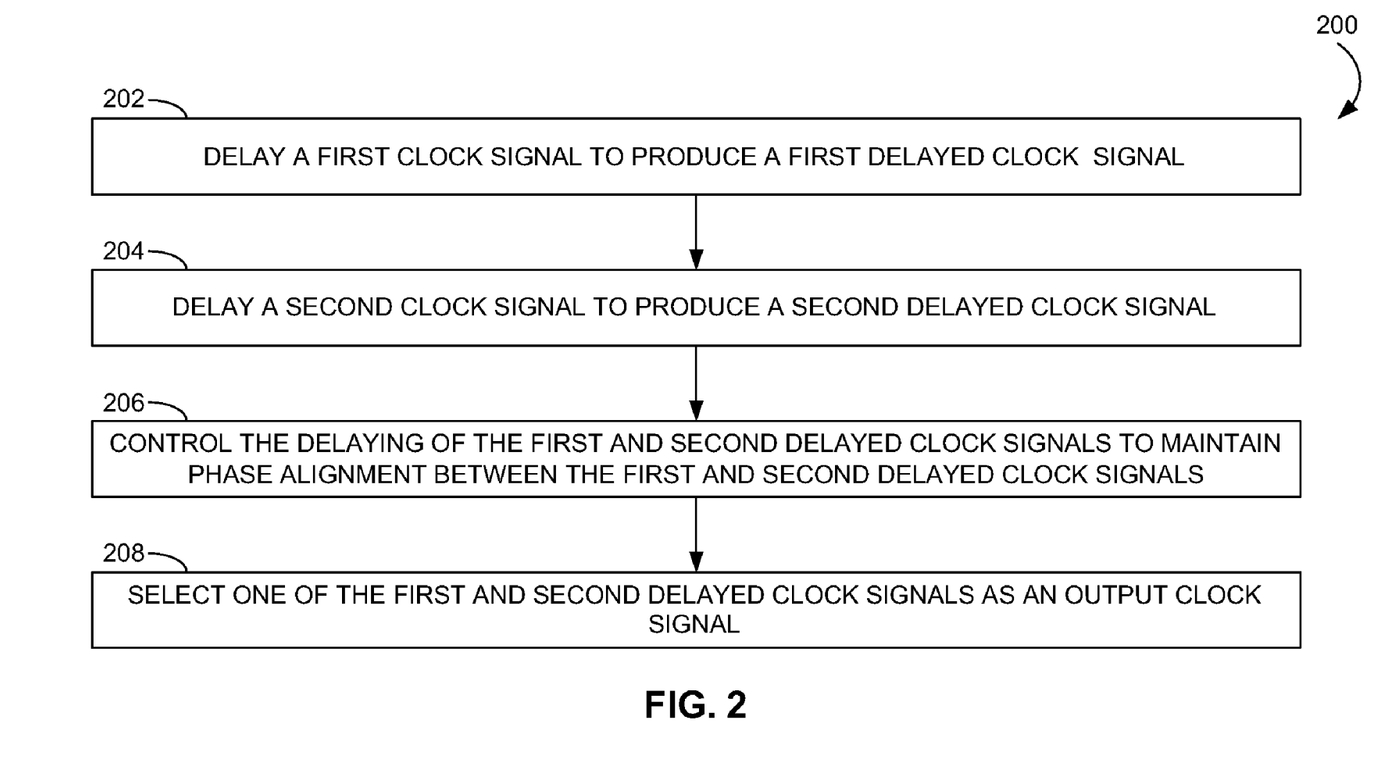
FIG. 2 is flow diagram of a method for according to an embodiment of the invention for switching between redundant clock signals.

Another possible embodiment of the invention—a method 200 for switching between redundant clock signals—is presented by way of a flow diagram in FIG. 2. In the method 200, a first clock signal is delayed to produce a first delayed clock signal (operation 202). Further, a second clock signal is delayed to produce a second delayed clock signal (operation 204). The delaying of the first and second clock signals is controlled to maintain phase alignment between the first and second delayed clock signals (operation 206). Further, one of the first and second delayed clock signals is selected as an output clock signal (operation 208). While FIG. 2 may imply a particular order of operation, the operations 202-208 of the method 200 may be performed in a different order from that shown in FIG. 2, including concurrently in some cases, while remaining with the scope of the invention as described herein.

Figure 3:
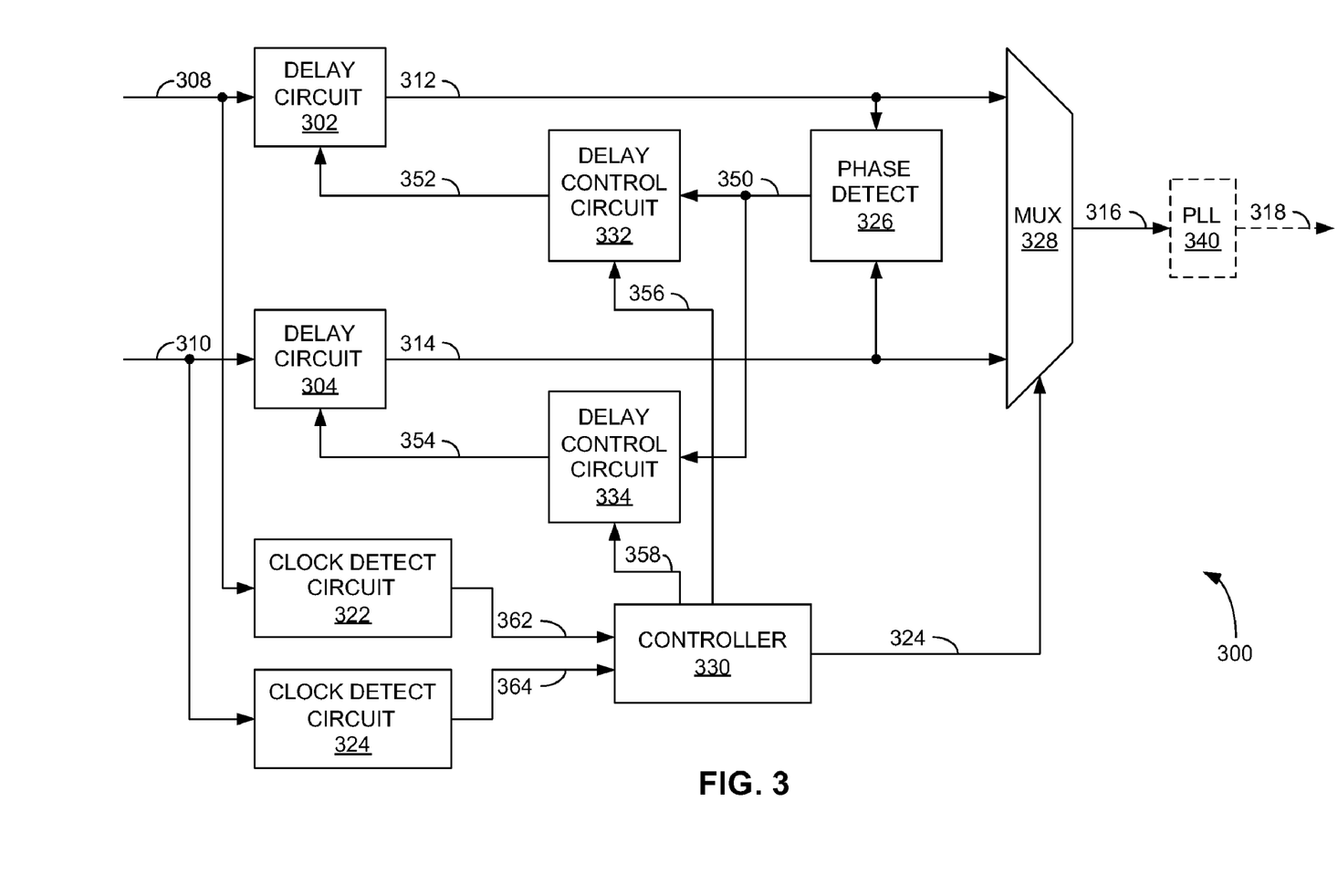
FIG. 3 is a block diagram of a redundant clock switch circuit according to another embodiment of the invention.

FIG. 3 illustrates a redundant clock switch circuit 300 according to another embodiment of the invention. As with the circuit 100 of FIG. 1, the redundant clock switch circuit 300 of FIG. 3 includes a first delay circuit 302 configured to delay a first clock signal 308 to produce a first delayed clock signal 312. The switch circuit 300 also includes a second clock signal 304 configured to delay a second clock signal 310 to generate a second delayed clock signal 314. Each of the delay circuits 302, 304 delays its clock signal 308, 310 by some controllable amount as described in greater detail below.

The switch circuit 300 also includes control logic which includes two clock detect circuits 322, 324, two delay control circuits 332, 334, a phase detector 326, a multiplexer 328 and a controller 330. Also included in another embodiment of the switch circuit 300 is a PLL circuit 340. Each of these components and their role within the switch circuit 300 is discussed in greater detail below.

The first clock detect circuit 322 is configured to generate a status of the first clock signal 308, while the second clock detect circuit 324 is configured to generate a status of the second clock signal 310. Each clock detect circuit 322, 324 may indicate whether a problem or fault was detected in its associated clock signal 308, 310. For example, the clock detect circuits 322, 324 may detect improper voltage levels, inadequate peak-to-peak voltage swings, short ("runt") pulses, an incorrect frequency, and other faults of the clocks signals 308, 310. Upon detection of a fault in one of the clock signals 308, 310, the associated clock detect circuit 322, 324 indicates that status by way of a clock error signal 362, 364. In one embodiment, the clock error signal 362, 364 remains active until the fault or error condition exhibited by the associated clock signal 308, 310 has abated for some predetermined period of time.

Based on the clock signal status associated with the first and second clock signals 308, 310, as indicated by the clock error signals 362, 364, the controller 330 selects one of the delayed clock signals 312, 314 as an output clock signal 316 to drive logic circuitry, such as a microprocessor, microcontroller, digital signal processor (DSP), or other synchronous logic. To that end, the controller 330 utilizes a clock select signal 324 to control the multiplexer 328, which receives the first and second delayed clock signals 312, 314, as input and passes one of these clock signals 312, 314 through as the output clock signal 316, depending on the state of the clock select signal 324.

In one embodiment, the first and second delay circuits 302, 304 delay the first and second clock signals 308, 310 a minimum length of time necessary to allow the controller 330 to react to the clock error signals 362, 364 and set the multiplexer 328 to a desired state before problems detected in the first or second clock signals 308, 310 reach the input of the multiplexer 328. Such a configuration for the switch circuit 300 may prevent clock signal errors from being transferred to the output clock signal 316.

The controller 330, via the phase detector 326 and the delay control circuits 332, 334, adjusts the delay circuits 302, 304 to maintain phase alignment between the first and second delayed clock signals 312, 314. In so doing, a phase error need not be introduced into the output clock signal 316 when the controller 330 switches from one to the other of the delayed clock signals 312, 314 via the multiplexer 328. To accomplish this task in one embodiment, the phase detector 326 takes the first and second delayed clock signals 312, 314 and generates a phase difference signal 350 indicating the relative phase difference between the delayed clock signals 312, 314. In one implementation, the phase difference signal 350 is a signal denoting a numeric value, possibly formatted in 1's complement, 2's complement, or sign-and-magnitude format, indicating the phase of one of the delayed clock signals 312, 314 relative to the other.

The phase difference signal 350 is received as a control input by each of the delay control circuits 332, 334. More specifically, the first delay control circuit 332 utilizes the phase of the first delayed clock signal 312 relative to the phase of the second delayed clock signal 314 as a control input in one embodiment, while the second delay control circuit 334 uses the phase of the second delayed clock signal 314 relative to that of the first delayed clock signal 312. In that particular implementation, one of the delay control circuits 332, 334 inverts the sign of the phase difference signal 350 to generate the observed relative phase difference signal appropriate for that delay control circuit 332, 334. Such inversion may occur within one of the delay control circuits 332, 334, or external thereto (not shown in FIG. 3.)

Each of the delay control circuits 332, 334 of FIG. 3 also receives a separate delay control enable signal 356, 358 from the controller 330. When enabled, the delay control circuit 332, 334 adjusts the delay imposed on the clock signal 308, 310 by its associated delay circuit 302, 304 via a delay control signal 352, 354. More specifically, each delay control circuit 332, 334 continually adjusts the delay when enabled to maintain a substantially zero phase difference between the first and second delayed clock signals 312, 314. As a result of the operation of the first and second delay control circuits 332, 334, the first and second delayed clocks signals 312, 314 are essentially phase-aligned throughout the operation of the switch circuit 300. In one implementation, the delay control signals 352, 354 each represent an unsigned value indicating the amount of delay to be imposed by the delay circuit 302, 304 being controlled.

In the embodiment of FIG. 3, the controller 330 enables exactly one delay control circuit 332, 334 at a time. As a result, potential control loop instabilities that may arise when both delay control circuits 332, 334 are attempting simultaneously to reduce the phase difference between the delayed clock signals 312, 314 are eliminated.

In one particular implementation, the controller 330 enables the delay control circuit 332, 334 associated with the first delayed clock signal 312, 314 not being selected by the controller 330 at the time as the output clock signal 316. In other words, the delay for the clock signal 308, 310 serving as a secondary or backup clock signal is continually adjusted through its delay control circuit 332, 334 to match the phase of the other clock signal 308, 310 that serves as the source of the output clock signal 316.

Figure 4:
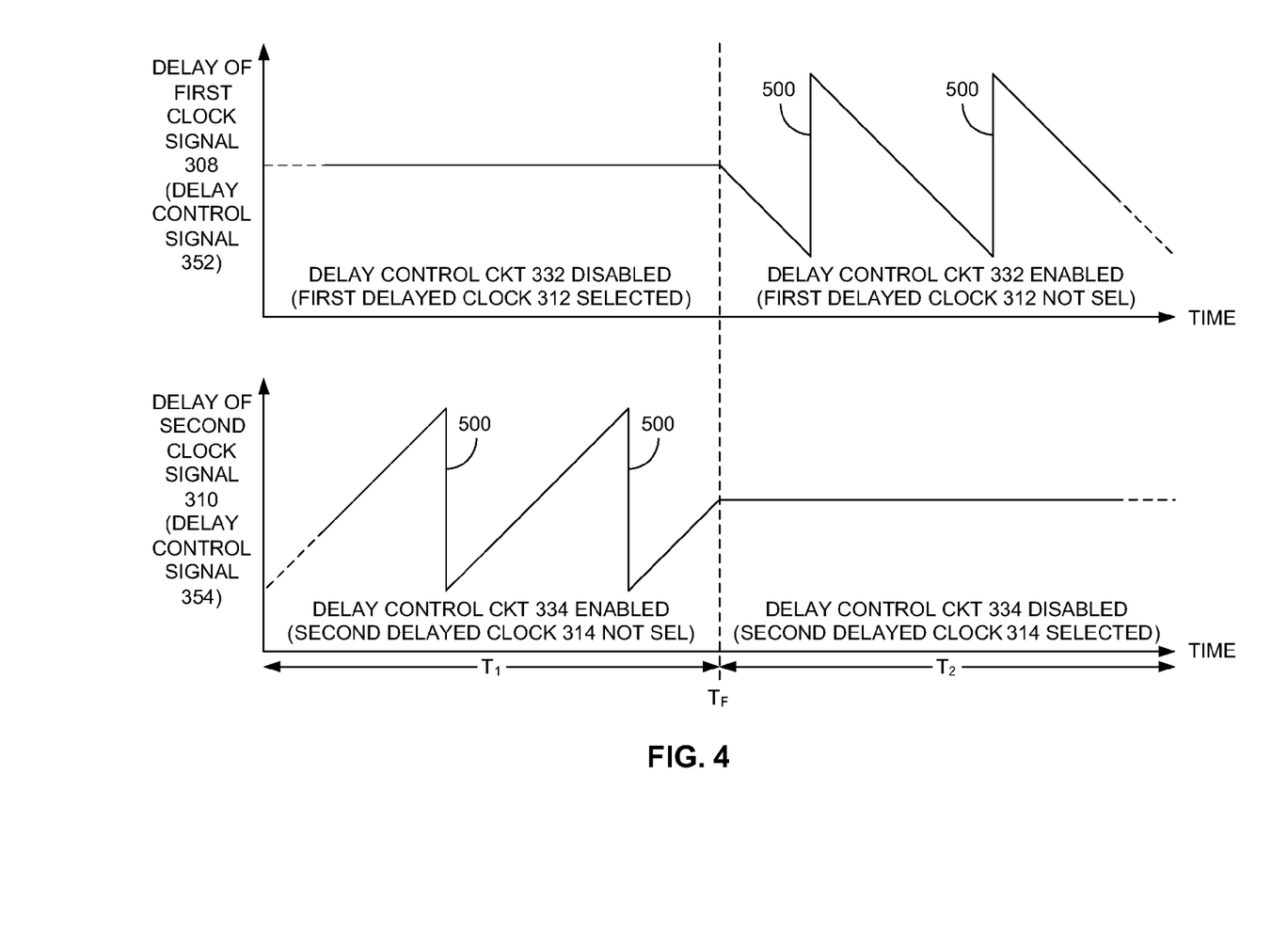
FIG. 4 is an idealized timing diagram describing the control of the two delay circuits of FIG. 3 before and after switching from one clock signal to another according to an embodiment of the invention.

Presuming that the first and second clock signals 308, 310 are of slightly different frequencies, the delay imposed by one or the other of the first and second delay circuits 302, 304 will likely require continuous adjustment via the delay control circuits 332, 334 to maintain phase alignment between the first and second delayed clock signals 312, 314. FIG. 4 depicts one such example, whereby the top timing diagram indicates the magnitude of the delay imposed upon the first clock signal 308, while the bottom graph displays similar information related to the second clock signal 310. In this example, the frequency of the first clock signal 308 is slightly less than that of the second clock signal 310. This frequency difference, the magnitude of which may be only a few tens or hundreds of parts per million, may occur when each of the clock signals 308, 310 is sourced independently. Also in this case, the first delayed clock signal 312 is selected initially by the controller 330 to generate the output clock signal 316. More specifically, the controller 330 drives the clock select signal 324 during a first time period $T_1$ so that the multiplexer 328 passes the first delayed clock signal 312 to its output as the output clock signal 316.

During this same time period $T_1$, the controller 330 disables the first delay control circuit 332 so that the delay inserted by the first delay circuit 302 remains constant. In one embodiment, this delay is at least long enough to allow the controller 330 to react to the first clock error signal 362 and switch the multiplexer 328 to utilize the second delayed clock signal 314 as the output clock signal 316.

Also during the first time period $T_1$, the controller 330 enables the second delay control circuit 334 to adjust the second delay circuit 304 so that the second delayed clock signal 314 remains in phase alignment with the first delayed clock signal 312. With the frequency of the first clock signal 308 being slightly less than that of the second clock signal 310, and presuming low phase jitter for each of the clock signals 308, 310, the delay imposed upon the second clock signal 310 will need to be continually increased to maintain phase alignment. Presuming that the amount of delay that may be provided by the second delay circuit 304 is not unlimited, the second delay control circuit 334 is configured to reduce the amount of delay intermittently by approximately a period of the second clock signal 310. These reductions are portrayed as a periodic delay discontinuity 500 which essentially resets the delay introduced into the second clock signal 310 to a lesser value. As a result, the second delay control circuit 334 can maintain the proper delay for the second clock signal 310 while remaining within the operational limits of the second delay circuit 304.

Depending on the internal design of the second delay circuit 304, the delay discontinuities 500 may cause a signal glitch or other temporary anomaly within the second delayed control signal 314, making that signal unfit as a source of the output clock signal 316 during the delay discontinuities 500. Thus, according to one embodiment of the invention, the controller 330 may be configured to ensure that switching its selection from the first delayed clock signal 312 to the second delayed clock signal 314 does not occur during any of the delay discontinuities 500 of the first time period $T_1$. In another implementation, the second delay control circuit 334 may be configured to postpone any delay discontinuity 500 that may occur while the controller 330 switches its selection from the first delayed clock signal 312 to the second delayed clock signal 314 as the output clock signal 316. To incorporate this functionality, the controller 330 and the second delay control circuit 334 may require some interaction in the way of communication signals transmitted therebetween indicating an impending action, such as a delay discontinuity 500 by the second delay control circuit 334, or a switchover or failover from the first delayed clock signal 312 to the second delayed clock signal 314.

Presuming that the first clock detect circuit 322 notifies the controller 330 of a problem with the first clock signal 308 by way of the first clock error signal 362, the controller 330 reacts by initiating a failover from the first delayed clock signal 312 to the second delayed clock signal 314 as the output clock signal 316 at time $T_F$ (indicated in FIG. 4) by way of the clock select signal 324. At that time, the controller 330 also disables the second delay control circuit 334 and enables the first delay control circuit 332. As a result, during a second time period $T_2$ following the failover at $T_F$, the first delay control circuit 332 is enabled, resulting in continual adjustment of the delay imposed upon the first clock signal 308 by way of the first delay circuit 302. Presuming that the first clock signal 308 continues to have a slightly lower frequency than the second clock signal 310, the delay imposed is continually decreased during time $T_2$. Further, the first delay control circuit 332 may periodically increase the delay imposed via the delay circuit 302 by approximately a period of the first clock signal 308 before the delay reaches zero or some other minimum delay value. This periodic increase in delay may appear as one or more delay discontinuities 500 in the magnitude of the delay imposed by the first delay control circuit 332. During this same time period $T_2$, the second delay circuit 304 maintains a constant delay for the second delayed clock signal 314 due to the second delay control circuit 334 being disabled.

While the example of FIG. 4 presents a particular scenario in which the frequency of the first clock signal 308 remains slightly less than that of the second clock signal 310, the first and second delay control circuits 332, 334 may be configured to maintain phase alignment between the delayed clock signals 312, 314 as the frequencies and relative phases of the clock signals 308, 310 change over time. Also, while a single failover point $T_F$ is portrayed in FIG. 4, other failover points at which the controller 330 switches from one delayed clock signal 312, 314 to the other are contemplated herein.

By holding constant the delay of the particular delayed clock signal 312, 314 being used to produce the output clock signal 316, any possibility of introducing signal glitches due to delay continuities 500 is essentially eliminated, thus promoting stability in the output clock signal 316 and the logic circuits it drives. Instead, any delay discontinuities 500 are relegated to the delayed clock signal 312, 314 not being employed at the time to generate the output clock signal 316.

In another embodiment of the invention, a PLL circuit 340 may be incorporated into the clock switch circuit 300 such that the first output clock signal 316 from the multiplexer 328 may drive the PLL circuit 340 to generate a second output clock signal 318 for driving other logic circuitry. The PLL circuit 340 may be employed to prevent any potential glitches or other temporary defects of the first output clock signal 316 from being incorporated into the second output clock signal 318. The multiplexer 328, under the guidance of the controller 330, may introduce such errors if, for example, the controller 330 transitions its selection from one delayed clock signal 312, 314 around the time one or both of the delayed clock signals 312, 314 is performing a low-to-high or high-to-low logic transition. Such may be the case if the multiplexer 328 incorporates a typical asynchronous logic design of standard combinatorial logic. In another embodiment, the multiplexer 328 may instead incorporate flip-flops or other latches which condition the inputs being driven by the delayed clock signals 312, 314, thus facilitating a synchronous logic design for the multiplexer 328. Such conditioning of the inputs may prevent switching from one delayed clock signal 312, 314 to another as the source of the first output clock signal 316 during the logical transitions of the clock signals 312, 314. In that case, use of the PLL circuit 340 to further condition the first output clock signal 316 is likely unnecessary.

Various embodiments of the redundant clock switch circuits and associated methods described herein ensure that the delayed versions of the redundant clock signals remain phase-aligned. As a result, the introduction of a phase delay into the resulting output clock signal to maintain a consistent phase for the output clock signal during a failover is essentially eliminated, thus reducing the possibility of inducing instability in downstream PLL circuits driven by the output clock signal. Moreover, use of a synchronous multiplexer or similar circuit as the switching method may eliminate the need for a PLL circuit to prevent glitches at the output clock circuit altogether, thus generally preserving the jitter characteristics of the original clock signals and further avoiding cascaded PLL instability.

While several embodiments of the invention have been discussed herein, other embodiments encompassed by the scope of the invention are possible. For example, while many embodiments as described above specifically involve the use of two input clock signals to provide redundancy for the output clock signal, other embodiments utilizing more than two clocks may be employed in other embodiments. For each additional input clock signal, the switch circuit may employ another delay circuit and delay control circuit, as described above. Also, additional phase detectors may be utilized to determine the relative phase between any two of the input clock signals, presuming the need to replace any input clock signal with another as the source for the output clock signal. In addition, while the use of the clock switch is discussed prominently with respect to computer systems, application of the principles outlined herein may apply to many different types of electronic systems, such as general-purpose computer systems, network and communication servers, special-purpose electronic devices, and any other electronic system potentially benefiting from the use of a redundant clock switch circuit. Further, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims.

What is claimed is:

1. A redundant clock switch circuit, comprising:
a first delay circuit configured to delay a first clock signal to produce a first delayed clock signal;
a second delay circuit configured to delay a second clock signal to produce a second delayed clock signal, wherein the first and second clock signals are provided by independent, redundant clock sources;
control logic configured to control the first and second delay circuits to maintain phase alignment between the first and second delayed clock signals, and to select one of the first and second delayed clock signals as a first output clock signal; and
a phase-locked loop circuit configured to generate a second output clock signal phase-locked to the first output clock signal, wherein the control logic comprises:
a first clock detect circuit configured to generate a first clock status of the first clock signal;
a second clock detect circuit configured to generate a second clock status of the second clock signal;
a controller configured to select one of the first and second delayed clock signals based on the first and second clock status;
a multiplexer configured to receive the first and second delayed clock signals and output the one of the first and second delayed clock signals selected by the controller as the first output clock signal;
a phase detector configured to determine a relative phase between the first and second delayed clock signals;
a first delay control circuit configured to maintain phase alignment between the first and second delayed clock signals by controlling the first delay circuit when enabled by the controller; and
a second delay control circuit configured to maintain phase alignment between the first and second delayed clock signals by controlling the second delay circuit when enabled by the controller;
wherein the controller is configured to enable the first delay control circuit while the second delayed clock signal is selected, and to enable the second delay control circuit while the first delayed clock signal is selected.

2. The redundant clock switch circuit of claim 1, wherein:
the first clock delay circuit comprises a maximum delay greater than a period of the first clock signal; and
the second clock delay circuit comprises a maximum delay greater than a period of the second clock signal.

3. The redundant clock switch circuit of claim 1, wherein the multiplexer comprises a synchronous multiplexer.

4. The redundant clock switch circuit of claim 1, wherein:
the first clock detect circuit is configured to generate the first clock status based upon one or more of a voltage level of the first clock signal, a peak-to-peak voltage level of the first clock signal, a frequency of the first clock signal, and a pulse length or height of the first clock signal; and
the second clock detect circuit is configured to generate the second clock status based upon one or more of a voltage level of the second clock signal, a peak-to-peak voltage of the second clock signal, a frequency of the second clock signal, and a pulse length or height of the second clock signal.

5. A redundant clock switch circuit, comprising:
a first delay circuit configured to delay a first clock signal to produce a first delayed clock signal;
a second delay circuit configured to delay a second clock signal to produce a second delayed clock signal; and
control logic configured to control the first and second delay circuits to maintain phase alignment between the first and second delayed clock signals, and to select one of the first and second delayed clock signals as an output clock signal,
wherein the control logic further comprises:
a phase detector configured to determine a relative phase between the first and second delayed clock signals;
a first delay control circuit configured to maintain phase alignment between the first and second delayed clock signals by controlling the first delay circuit when enabled by the control logic; and
a second delay control circuit configured to maintain phase alignment between the first and second delayed clock signals by controlling the second delay circuit when enabled by the control logic,
wherein the control logic is configured to enable the first delay control circuit while the second delayed clock signal is selected, and to enable the second delay control circuit while the first delayed clock signal is selected, wherein:
the first delay control circuit is configured to cause the first delay circuit to insert a delay discontinuity into the first delayed clock signal to maintain phase alignment between the first and second delayed clock signals when enabled; and
the second delay control circuit is configured to cause the second delay circuit to insert a delay discontinuity into the second delayed clock signal to maintain phase alignment between the first and second delayed clock signals when enabled.

6. The redundant clock switch circuit of claim 5, wherein the control logic is configured to delay switching from one of the first and second delayed clock signals to the other of the first and second delayed clock signals as the output clock signal while the first or second delay control circuit is inserting a delay discontinuity into one of the first and second delayed clock signals.

7. The redundant clock switch circuit of claim 5, wherein each of the first and second delay control circuits is configured to delay inserting a delay discontinuity into one of the first and delay control signals while the control logic switches from one of the first and second delayed clock signals to the other of the first and second delayed clock signals as the output clock signal.

8. A method for switching between redundant clock signals, the method comprising:
delaying a first clock signal provided by a first clock source to produce a first delayed clock signal;
delaying a second clock signal provided by a second, independent clock source to produce a second delayed clock signal;
controlling the delaying of the first and second clock signals to maintain phase alignment between the first and second delayed clock signals;
selecting one of the first and second delayed clock signals as a first output clock signal; and
generating a second output clock signal phase-locked to the first output clock signal, wherein selecting one of the first and second delayed clock signals comprises:
generating a first clock status of the first clock signal;
generating a second clock status of the second clock signal; and selecting one of the first and second delayed clock signals as the first output clock signal based on the first and second clock status, wherein controlling the delaying of the first and second clock signals comprises:

determining a relative phase between the first and second delayed clock signals;

controlling the delaying of the first clock signal to maintain phase alignment between the first and second delayed clock signals while the second delayed clock signal is selected as the output clock signal; and controlling the delaying of the second clock signal to maintain phase alignment between the first and second delayed clock signals while the first delayed clock signal is selected as the output clock signal.

9. The method of claim 8, wherein:

the first clock status is generated based upon one or more of a voltage level of the first clock signal, a peak-to-peak voltage level of the first clock signal, a frequency of the first clock signal, and a pulse length or height of the first clock signal; and the second clock status is generated based upon one or more of a voltage level of the second clock signal, a peak-to-peak voltage level of the second clock signal, a frequency of the second clock signal, and a pulse length or height of the second clock signal.

10. A method for switching between redundant clock signals, the method comprising:

delaying a first clock signal to produce a first delayed clock signal;

delaying a second clock signal to produce a second delayed clock signal;

controlling the delaying of the first and second clock signals to maintain phase alignment between the first and second delayed clock signals; and selecting one of the first and second delayed clock signals as an output clock signal;

wherein controlling the delaying of the first and second clock signals comprises:

determining a relative phase between the first and second delayed clock signals;

controlling the delaying of the first clock signal to maintain phase alignment between the first and second delayed clock signals while the second delayed clock signal is selected as the output clock signal;

controlling the delaying of the second clock signal to maintain phase alignment between the first and second delayed clock signals while the first delayed clock signal is selected as the output clock signal;

inserting a delay discontinuity into the first delayed clock signal to maintain the relative phase delay between the first and second delayed clock signals while the second delayed clock signal is selected as the output clock signal; and inserting a delay discontinuity into the second delayed clock signal to maintain the relative phase delay between the first and second delayed clock signals while the first delayed clock signal is selected as the output clock signal.

11. The method of claim 10, further comprising:

delaying switching from one of the first and second delayed clock signals to the other of the first and second delayed clock signals as the output clock signal while inserting the delay discontinuity into one of the first and second delayed clock signals.

12. The method of claim 10, further comprising:

delaying inserting the delay discontinuity into one of the first and delay control signals while switching from one of the first and second delayed clock signals to the other of the first and second delayed clock signals as the output clock signal.

13. The redundant clock switch circuit of claim 5, wherein the control logic is configured to avoid switching between the first and second delayed clock signals during any of the delay discontinuities.

14. The method of claim 10, further comprising:

avoiding switching between the first and second delayed clock signals during any of the delay discontinuities.

15. A system comprising:

first and second independent, redundant clock sources to produce corresponding first and second clock signals; and a redundant clock switch circuit comprising:

a first delay circuit configured to delay the first clock signal to produce a first delayed clock signal;

a second delay circuit configured to delay the second clock signal to produce a second delayed clock signal;

a first clock detect circuit configured to generate a first clock status of the first clock signal;

a second clock detect circuit configured to generate a second clock status of the second clock signal control logic configured to control the first and second delay circuits to maintain phase alignment between the first and second delayed clock signals, and to select one of the first and second delayed clock signals as a first output clock signal in response to the first clock status and the second clock status; and a phase-locked loop circuit configured to generate a second output clock signal phase-locked to the first output clock signal.

16. A redundant clock switch circuit, comprising:

a first delay circuit configured to delay a first clock signal to produce a first delayed clock signal;

a second delay circuit configured to delay a second clock signal to produce a second delayed clock signal, wherein the first and second clock signals are provided by independent, redundant clock sources;

control logic configured to control the first and second delay circuits to maintain phase alignment between the first and second delayed clock signals, and to select one of the first and second delayed clock signals as a first output clock signal; and a phase-locked loop circuit configured to generate a second output clock signal phase-locked to the first output clock signal, wherein the control logic comprises:

a first clock detect circuit configured to generate a first clock status of the first clock signal;

a second clock detect circuit configured to generate a second clock status of the second clock signal;

a controller configured to select one of the first and second delayed clock signals based on the first and second clock status;

a multiplexer configured to receive the first and second delayed clock signals and output the one of the first and second delayed clock signals selected by the controller as the first output clock signal;

a first delay control circuit configured to maintain phase alignment between the first and second delayed clock signals by controlling the first delay circuit when enabled by the control logic; and a second delay control circuit configured to maintain phase alignment between the first and second delayed clock signals by controlling the second delay circuit when enabled by the control logic, wherein the control logic is configured to further selectively enable different ones of the first and second delay control circuits depending on which of the first and second delayed clock signals is selected, wherein the first delay control circuit is enabled if the second delayed clock signal is selected, and the second delay control circuit is enabled if the first delayed clock signal is selected.

17. The redundant clock switch circuit of claim 5, wherein the control logic is configured to selectively enable different ones of the first and second delay control circuits depending on which of the first and second delayed clock signals is selected.

18. A method for switching between redundant clock signals, the method comprising:
- delaying a first clock signal provided by a first clock source to produce a first delayed clock signal;
- delaying a second clock signal provided by a second, independent clock source to produce a second delayed clock signal;
- controlling the delaying of the first and second clock signals to maintain phase alignment between the first and second delayed clock signals;
- selecting one of the first and second delayed clock signals as a first output clock signal; and
- generating a second output clock signal phase-locked to the first output clock signal, wherein selecting one of the first and second delayed clock signals comprises:
  - generating a first clock status of the first clock signal;
  - generating a second clock status of the second clock signal; and
  - selecting one of the first and second delayed clock signals as the first output clock signal based on the first and second clock status,
- controlling, with a first delay control circuit when enabled, delaying of the first clock signal by maintaining phase alignment between the first and second delayed clock signals;
- controlling, with a second delay control circuit when enabled, delaying of the second clock signal by maintaining phase alignment between the first and second delayed clock signals;
- selectively enabling different ones of the first and second delay control circuits depending on which of the first and second delayed clock signals is selected, wherein the first delay control circuit is enabled if the second delayed clock signal is selected, and the second delay control circuit is enabled if the first delayed clock signal is selected.

19. The method of claim 10, further comprising:
- selectively enabling controlling of delaying of the first and second clock signals depending on which of the first and second delayed clock signals is selected, wherein controlling of delaying of the first clock signal is enabled if the second delayed clock signal is selected, and controlling of delaying of the second clock signal is enabled if the first delayed clock signal is selected.

20. The system of claim 15, wherein the control logic further comprises:
- a first delay control circuit configured to maintain phase alignment between the first and second delayed clock signals by controlling the first delay circuit when enabled by the control logic; and
- a second delay control circuit configured to maintain phase alignment between the first and second delayed clock signals by controlling the second delay circuit when enabled by the control logic,
- wherein the control logic is configured to further selectively enable different ones of the first and second delay control circuits depending on which of the first and second delayed clock signals is selected, wherein the first delay control circuit is enabled if the second delayed clock signal is selected, and the second delay control circuit is enabled if the first delayed clock signal is selected.

* * * * *